Oct. 24, 1933.                    J. P. O'BRIEN                    1,931,901
                                   CONE BRAKE
                               Filed April 23, 1930
Fig. 1
Fig. 2
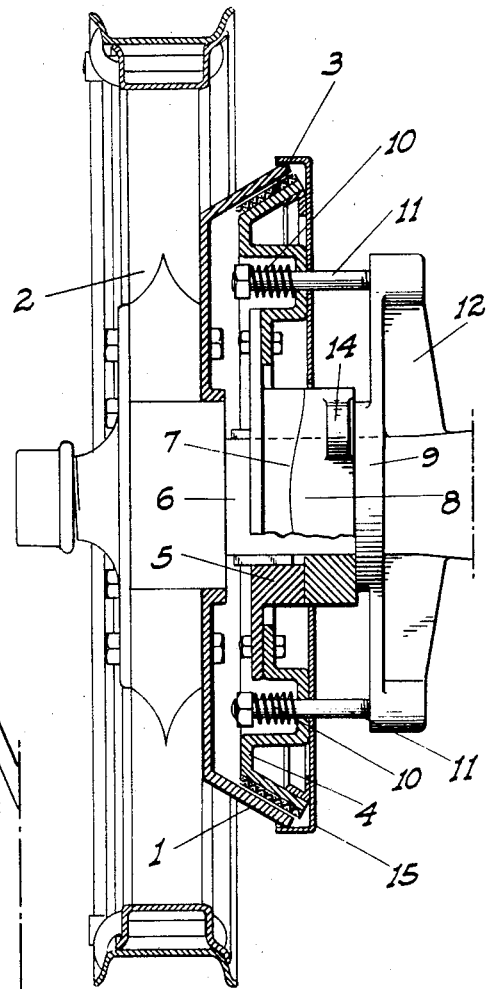
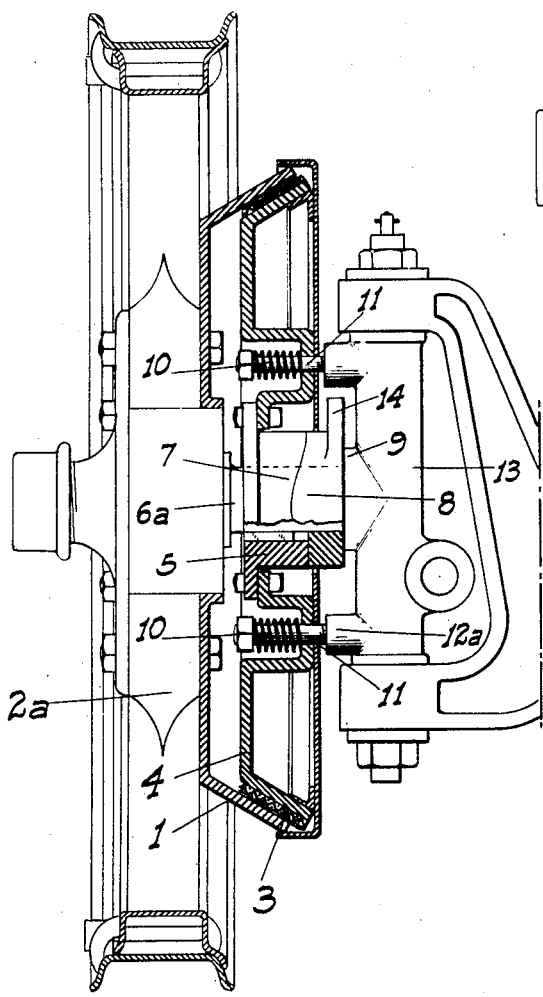
INVENTOR
James P. O'Brien
BY
ATTORNEY Patented Oct. 24, 1933

1,931,901

UNITED STATES PATENT OFFICE 1,931,901

CONE BRAKE

James Patrick O'Brien, Marysville, Calif.

Application April 23, 1930. Serial No. 446,522

2 Claims. (Cl. 188—72)

This invention relates to brakes for motor vehicles, my principal object being to provide a brake for the purpose which has a large and continuous braking surface; one in which the frictional engagement is equalized over the entire area of the braking surface; one which takes hold and releases very quickly; which may be easily and evenly adjusted as wear develops; and which may be applied with material change to either the rear or front wheels or axles, and to either the Elliott or reversed Elliott type of front axle.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Fig. 1 is a sectional plan of my improved brake as applied to a rear wheel.

Fig. 2 is a vertical transverse section of the structure as applied to a front wheel.

It may be here mentioned that the parts of the structure, except for certain changes in size necessitated by the difference in the relative size of the front wheel spindle and rear axle housing, are identical for either the front or rear wheels and hence will be described together as being the same.

Referring now more particularly to the characters of reference on the drawing, the structure in either case comprises a brake drum 1, having an internal frusto-conical braking surface and adapted to be rigidly secured to the rear wheel 2 or to the front wheel 2a in the usual manner. Engageable with the inner face of the drum and parallel thereto is a continuous friction band 3, rigidly fixed on a spider 4. This spider has a hub 5 slidably secured either on the rear axle housing 6 of the adjacent wheel or on the front wheel spindle 6a; said spindle for this purpose being made somewhat elongated. The outer edge of the hub is cut on a slant or diagonally and forms a cam surface 7 which is engaged by the adjacent and similarly cut edge of a cooperating cam member 8 which is turnable on the housing or spindle beyond the spider. The actuating cam 8 is held against movement away from the spider by a stop shoulder 9 provided on said axle housing or spindle.

The spider is normally drawn away from the wheel so that the band 3 clears the drum and the cam edge 7 is constantly held against the corresponding edge of the cam 8, by compression springs 10. These springs are mounted on the outer ends of studs 11, or between the spider and drum; which spindles are disposed parallel to the front axles and slidably project through the spider. These studs are supported from one end by means of lugs 12 projecting radially from the housing 6 or by bosses 12a formed on the steering knuckle 13 of the front wheel and from which the spindle 6a projects as usual. The cam 8 is provided with a radially projecting ear 14 to which the ordinary form of pull rod, cable, or other mechanical or hydraulically controlled actuating means, to rotate the cam, may be applied. The engaging surfaces of the brake members are preferably protected from dirt and the like by a suitable cover 15 mounted in connection with the spider and overlapping the annular space between the adjacent ends of the spider and drum, as shown.

In operation it will be seen that as the cam 8 is rotated in a certain direction, the spider will be moved toward the drum and the band 3 will frictionally engage said drum with equal pressure throughout its area. Wear will therefore take place evenly all around the band instead of at separated places as is usually the case with the present form of brake structures. As soon as the rotative pressure on the cam is released the springs 10 act to move the spider away from the wheel, and such movement being imparted to the entire area of the brake band simultaneously, the brake is instantly released and there is no danger of the band remaining against the drum at any point and inducing drag and consequently heating and uneven wear.

When any adjustment due to the wear of the band is required it is only necessary to take up the operating connections of the cam 8 to a certain extent, so as to correspondingly rotate the cam a short distance and thus cause the spider to be normally disposed closer to the drum, without the brake pedal which is connected to said cam being depressed.

The brake is also suitable for use in connection with airplane landing wheels.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a wheel brake structure which includes a cam member slidable on the axle of the wheel and a cooperating operating cam turnable on the axle outwardly of the first named cam member, a brake-band supporting disc secured to said first named cam member and including a portion concentric with and lying in a transverse plane intermediate the ends of the operating cam, a guard plate secured to said projecting disc portion and closely surrounding said operating cam, and a lug for connection to an operating member projecting from the exposed portion of the operating cam.

2. In a wheel brake structure which includes a cam member slidable on the axle of the wheel and a cooperating operating cam turnable on the axle outwardly of the first named cam member, a brake-band supporting disc secured to said first named cam member, a guard plate secured to said disc and closely surrounding the operating cam intermediate the ends of the latter, and operating means for said cam applied to the exposed portion of the same.

JAMES PATRICK O'BRIEN.